(12) United States Patent
Haneda et al.

(10) Patent No.: US 6,362,985 B1
(45) Date of Patent: Mar. 26, 2002

(54) POWER TRANSMISSION APPARATUS AND METHOD FOR POWER TRANSMISSION

(75) Inventors: Masaji Haneda; Someji Inoue, both of Tokyo (JP)

(73) Assignees: NTT Data Corporation; Sinano Electric Co., Ltd., both of Tokyo (JP)

( * ) Notice: Subject to any disclaimer, the term of this patent is extended or adjusted under 35 U.S.C. 154(b) by 0 days.

(21) Appl. No.: 09/744,863

(22) PCT Filed: May 29, 2000

(86) PCT No.: PCT/JP00/03424

§ 371 Date: Jan. 26, 2001

§ 102(e) Date: Jan. 26, 2001

(87) PCT Pub. No.: WO00/74199

PCT Pub. Date: Dec. 7, 2000

(30) Foreign Application Priority Data

May 27, 1999 (JP) ............................................ 11-147374

(51) Int. Cl.[7] ...................... H02M 5/42; H02M 7/5387; H02M 7/44
(52) U.S. Cl. .............................. 363/98; 363/132; 363/17
(58) Field of Search ................................. 363/17, 56.02, 363/95, 98, 132

(56) References Cited

U.S. PATENT DOCUMENTS

| | | | | |
|---|---|---|---|---|
| 3,742,330 A | * | 6/1973 | Hodges et al. | 363/41 |
| 4,636,929 A | * | 1/1987 | Nakamura et al. | 363/56 |
| 5,416,686 A | * | 5/1995 | Azuma et al. | 363/37 |

FOREIGN PATENT DOCUMENTS

| | | | |
|---|---|---|---|
| JP | 09-172784 | 6/1997 | H02M/7/48 |
| JP | 10-014252 | 1/1998 | H02M/7/48 |
| JP | 63-124771 | 5/1998 | H02M/7/48 |
| JP | 10-207559 | 8/1998 | G05F/1/67 |

* cited by examiner

Primary Examiner—Bao Q. Vu
(74) Attorney, Agent, or Firm—Baker & McKenzie

(57) ABSTRACT

The transfer switch (6) supplies the DC voltage supplied from the DC power source section (5), to the commercial electricity system (8) in such a way as to provide the DC voltage with the same polarity as the AC voltage generated by the commercial electricity system (8) according to the control of the commercial voltage monitor section (7) when the absolute value of the voltage of the commercial electricity system (8) is higher than the voltage threshold level. When the absolute value of the AC voltage is lower than the voltage threshold level, the supply of the DC voltage from the DC power source section (5) is interrupted. The generator (2) and the commercial electricity system (8) are isolated from each other by the isolation transformer (4).

16 Claims, 4 Drawing Sheets

POWER TRANSMISSION APPARATUS AND METHOD FOR POWER TRANSMISSION

TECHNICAL FIELD

The present invention relates to a power transmission device and a method of transmitting power, especially to a power transmission device and a method of transmitting power to a commercial electricity system.

BACKGROUND ART

When a direct current (DC) electric power is supplied to a commercial electricity system, the DC voltage is inverted to an alternating current (AC) voltage by an inverter, and then the inverted voltage is supplied to a commercial electricity system. The DC electric power is generated by a generator such as a solar battery and the like. The inverter modulates the voltage waveform by the pulse width modulation (PWM) to correct the error (difference) between the inverted AC waveform and the voltage waveform of a commercial electricity system.

For the PWM, a complex control circuit is required to control the frequency and phase of the voltage. This control circuit raises the price of the power transmission device as well as complicates the structure of the power transmission device.

And in the case where the inverter is damaged, there is a possibility of electric power generated by the generator leaking to a commercial electricity system without being controlled. Further, there is a possibility of devices connected to a commercial electricity system being damaged by an electricity leakage (i.e., a possibility of a secondary damage being caused).

DISCLOSURE OF INVENTION

The present invention was made in view of the above circumstances, and it is the first object of this invention to provide a power transmission device and a method of transmitting power which are simply composed.

Further, it is the second object of this invention to provide a power transmission device and a method of transmitting power which are low-cost.

And it is the third object of this invention to provide a power transmission device and a method of transmitting power which can prevent electricity from leaking from a generator to a commercial electricity system and consequently can prevent the occurrence of the secondary damage.

To achieve the above objects, the power transmitting device according to the first aspect of this invention is located between an AC (alternating current) power source (8) for generating an AC voltage and a DC (direct current) power source (2, 3, 4, and 5) for generating a DC voltage, and comprises:

- a transfer switch (6) which is connected to between the DC power source and the AC power source and is for supplying the DC voltage to the AC power source or interrupting a supply of the DC voltage to the AC power source in accordance with a control signal provided thereto; and
- an AC voltage monitor circuit (7) which is connected to the AC power source and the transfer switch and is for determining whether an absolute value of the AC voltage generated by the AC power source is equal to or higher than a predetermined threshold level or not, supplying the transfer switch with the control signal for controlling the transfer switch to supply the DC voltage to the AC power source in such a way as to provide the DC voltage with the same polarity as the AC voltage when determining that the absolute value is equal to or higher than the threshold level, and supplying the transfer switch with the control signal for controlling the transfer switch to interrupt the supply of the DC voltage to the AC power source when determining that the absolute value is lower than the threshold level.

According to this structure, the DC voltage output by the DC power source is supplied to the AC power source via the transfer switch or interrupted to be supplied depending on whether or not the AC voltage generated by the AC power source is higher than the voltage threshold level. Accordingly, there is no need for pulse-width modulation (PWM) and a complex control circuit necessary for PWM. Therefore, the structure will be simple.

An output impedance of the DC power source may be higher than that of the AC power source, and a voltage drop generated in an outside load which is connected to the AC power source by an electric current supplied from the DC power source may be higher than the AC voltage generated by the AC power source.

In this case, the voltage between both ends of the load is maintained approximately equal to the AC voltage generated by the AC power source.

The AC voltage monitor circuit may further comprise a half cycle monitor circuit (104) for determining whether or not a period of time in which the DC power source is supplying the DC voltage to the AC power source is over a half of a cycle of an AC electric power generated by the AC power source, and supplying the transfer switch with the control signal for controlling the transfer switch to interrupt the supply of the DC voltage from the DC power source to the AC power source when determining that the period of time is over the half of the cycle.

According to this half cycle monitor circuit, the AC power source is cut away from the DC power source when the AC power source is out of order so that a period of time in which the DC power source is supplying the DC voltage becomes over the half of the cycle of the AC voltage. Therefore, an electricity leakage from the DC power source to the AC power source can be prevented.

The transfer switch may comprise, for example:

- a first switching element (T1) which comprises a first electric current path and a first control terminal;
- a second switching element (T2) which comprises a second electric current path and a second control terminal;
- a third switching element (T3) which comprises a third electric current path and a third control terminal; and
- a fourth switching element (T4) which comprises a fourth electric current path and a fourth control terminal. In this case:
- one end of the first electric current path and one end of the third electric current path may be connected to one of a pair of electrodes which are provided on the DC power source and are for outputting the DC voltage;
- one end of the second electric current path and one end of the fourth electric current path may be connected to the other of the pair of electrodes provided on the DC power source;
- the other end of the first electric current path and the other end of the fourth electric current path may be connected to one of a pair of electrodes which are provided on the AC power source and are for outputting the AC voltage; and the other end of the second electric current path and the other end of the third electric current path may be connected to the other of the pair of electrodes provided on the AC power source.

And in this case, the AC voltage monitor circuit may:

determine whether a polarity of a voltage output from the one of the pair of electrodes provided on the DC power source is same as or different from that of a voltage output from the one of the pair of electrodes provided on the AC power source;

apply a voltage, for controlling the first and second electric current paths to turn on, to the first and second control terminals as the control signal, and apply a voltage, for controlling the third and fourth electric current paths to turn off (non-conductive), to the third and fourth control terminals as the control signal when determining that the absolute value of the AC voltage is equal to or higher than the threshold level, and that the polarity of the voltage output from the one of the pair of electrodes provided on the DC power source is same as that of the voltage output from the one of the pair of electrodes provided on the AC power source;

apply a voltage, for controlling the first and second electric current paths to turn off, to the first and second control terminals as the control signal, and apply a voltage for controlling the third and fourth electric current paths to turn on, to the third and fourth control terminals as the control signal when determining that the absolute value of the AC voltage is equal to or higher than the threshold level, and that the polarity of the voltage output from the one of the pair of electrodes provided on the DC power source is different from that of the voltage output from the one of the pair of electrodes provided on the AC power source; and apply a voltage, for controlling the first to fourth electric current paths to turn off, to the first to fourth control terminals as the control signal when determining that the absolute value of the AC voltage is lower than the thresholde level.

The 1st switching element may be composed of, for example, a first field effect transistor (T1) whose drain and source serve as both ends of the first electric current path and whose gate serves as the first control terminal.

The second switching element may be composed of, for example, a second field effect transistor (T2) whose drain and source serve as both ends of the second electric current path and whose gate serves as the second control terminal.

The third switching element may be composed of, for example, a third field effect transistor (T3) whose drain and source serve as both ends of the third electric current path and whose gate serves as the third control terminal.

The fourth switching element may be composed of, for example, a fourth field effect transistor (T4) whose drain and source serve as both ends of the fourth electric current path and whose gate serves as the 4th control terminal.

The AC voltage monitor circuit may determine whether or not a period of time in which the DC power source is supplying the DC voltage to the AC power source is over a half of a cycle of an AC electric power generated by the AC power source, and may apply a voltage for controlling the first to fourth electric current passages to turn off, to the first to fourth control terminals as the control signal when determining that the period of time is over the half of the cycle.

According to this structure, the AC power source is cut away or isolated from the DC power source when the AC power source is out of order so that a period of time in which the DC power source is supplying the DC voltage becomes over the half of the cycle of the AC voltage. Therefore, an electricity leakage from the DC power source to the AC power source can be prevented.

The power transmission device according to the second aspect of this invention is located between an AC power source (8) for generating an AC voltage and a DC power source (2) for generating a first DC voltage, and comprises:

a DC-AC converter (3) for converting the first DC voltage into an AC voltage and outputting it;

an isolation transformer (4) for transforming the AC voltage output by the DC-AC converter and outputting it;

a rectifier (5) for rectifying the AC voltage output by the isolation transformer to generate a second DC voltage;

a transfer switch (6) which is connected to between the rectifier and the AC power source, and is for supplying the second DC voltage to the AC power source or interrupting a supply of the second DC voltage to the AC power source in accordance with a control signal supplied thereto; and an AC voltage monitor circuit (7) which is connected to the AC power source and the transfer switch and is for determining whether an absolute value of the AC voltage generated by the AC power source is equal to or higher than a predetermined threshold level or not, supplying the transfer switch with the control signal for controlling the transfer switch to supply the second DC voltage to the AC power source in such a way as to provide the second DC voltage with the same polarity as the AC voltage when determining that the absolute value is equal to or higher than the threshold level, and supplying the transfer switch with the control signal for controlling the transfer switch to interrupt the supply of the second DC voltage to the AC power source when determining that the absolute value is lower than the threshold level.

According to this structure, the second DC voltage output by the rectifier is supplied to the AC power source via the transfer switch or interrupted to be supplied depending on whether or not the AC voltage generated by the AC power source is higher than the voltage threshold level. Accordingly, there is no need for pulse-width modulation (PWM) and a complex control circuit necessary for PWM. Therefore, the structure will be simple.

And according to this structure, the isolation transfer isolates the DC power source from the AC power source so that an electricity leakage between the DC power source and the AC power source is prevented.

An output impedance of the rectifier may be higher than that of the AC power source, and a voltage drop generated in an outside load which is connected to the AC power source by an electric current supplied from the rectifier may be higher than the AC voltage generated by the AC power source.

In this case, the voltage between both ends of the load is maintained approximately equal to the AC voltage generated by the AC power source.

The DC-AC converter may keep a level of the second DC voltage at an appropriate level by comprising:

an inverter (100) for inverting the first DC voltage into an AC voltage when the first DC voltage is applied thereto; and a DC voltage monitor circuit (101) for determining whether a level of the first DC voltage has reached a set level or not, applying the first DC voltage to the inverter when determining that it has reached the set level, and preventing application of the first DC voltage to the inverter when determining that it has not reached the set level.

The method of transmitting power according to the third aspect of this invention is a method of supplying a DC voltage to an AC power source which generates an AC voltage, wherein the method of transmitting power: determines whether an absolute value of the AC voltage generated by the AC power source is equal to or higher than a predetermined threshold level or not; supplies the DC voltage to the AC power source in such a way as to provide the DC voltage with the same polarity as the AC voltage when determining that the absolute value is equal to or higher than the threshold level; and interrupts a supply of the DC voltage to the AC power source when determining that the absolute value is lower than the threshold level.

According to this method, the DC voltage is supplied to the AC power source via a transfer switch or interrupted to be supplied depending on whether or not the AC voltage generated by the AC power source is higher than the voltage threshold level. Accordingly, there is no need for pulse-width modulation (PWM) and a complex control circuit necessary for PWM. Therefore, the structure for conducting this method will be simple.

An output impedance of a DC power source which generates the DC voltage may be higher than that of the AC power source, and a voltage drop generated in an outside load which is connected to the AC power source by an electric current supplied from the DC power source may be higher than the AC voltage generated by the AC power source.

In this case, the voltage between both ends of the load is maintained approximately equal to the AC voltage generated by the AC power source.

This method may determine whether or not a period of time in which the DC voltage is supplied to the AC power source is over a half of a cycle of an AC electric power generated by the AC power source, and may interrupt the supply of the DC voltage to the AC power source when determining that the period of time is over the half of the cycle.

According to this method, the AC power source is cut away from the power source of the DC voltage when the AC power source is out of order so that a period of time in which the power source of the DC voltage is supplying the DC voltage becomes over the half of the cycle of the AC voltage. Therefore, an electricity leakage from the power source of the DC voltage to the AC power source can be prevented.

In the case where the DC power source which generates the DC voltage comprises a pair of electrodes for outputting the DC voltage and the AC power source comprises a pair of electrodes for outputting the AC voltage, this method may:

whether a polarity of a voltage of one of the electrodes provided on the DC power source is same as or different from that of a voltage of one of the electrodes provided on the AC power source;

connect the one of the electrodes of the DC power source with the one of the electrodes of the AC power source, and connect the other of the electrodes of the DC power source with the other of the electrodes of the AC power source when determining that the absolute value of the AC voltage is equal to or higher than the threshold level, and that the polarity of the voltage of the one of the electrodes provided on the DC power source is same as the voltage of the one of the electrodes provided on the AC power source;

connect the one of the electrodes of the DC power source with the other of the electrodes of the AC power source, and connect the other of the electrodes of the DC power source with the one of the electrodes of the AC power source when determining that the absolute value of the AC voltage is equal to or higher than the threshold level, and that the polarity of the voltage of the one of the electrodes provided on the DC power source is different from that of the voltage of the one of the electrodes provided on the AC power source; and cut between each of the electrodes provided on the DC power source and each of the electrodes provided on the AC power source when determining that the absolute value of the AC voltage is lower than the threshold level.

The DC voltage may be generated by converting a DC voltage for conversion into an AC voltage, transforming the AC voltage acquired from conversion by an isolation transformer, and rectifying the AC voltage acquired from transformation.

According to this method, the isolation transformer isolates a power source of the DC voltage for conversion from the AC power source so that an electricity leakage from the power source of the DC voltage for conversion to the AC power source can be prevented.

This method may determine whether a level of the DC voltage for conversion has reached a set level or not, and prevent the conversion of the DC voltage for conversion into an AC voltage when determining that the level of the DC voltage for conversion has reached the set level, so that the level of the DC voltage applied to the AC power source may be kept at an appropriate level.

The power transmission device according to the fourth aspect of this invention is a device for supplying a DC voltage generated by DC power sources (2, 3, 4, and 5) to an AC power source (8) for generating an AC voltage, and comprises:

determination means (7) for determining whether an absolute value of the AC voltage generated by the AC power source is equal to or higher than a predetermined threshold level or not;

means (6) for supplying the DC voltage to the AC power source in such a way as to provide the DC voltage with the same polarity as the AC voltage when the determination means determines that the absolute value of the AC voltage is equal to or higher than the threshold level; and means (6) for interrupting a supply of the DC voltage to the AC power source when the determination means determines that the absolute value of the AC voltage is lower than the threshold level.

According to this structure, the DC voltage generated by the DC power sources is supplied to the AC power source or interrupted to be supplied depending on whether or not the AC voltage generated by the AC power source is higher than the voltage threshold level. Accordingly, there is no need for pulse-width modulation (PWM) and a complex control circuit necessary for PWM. Therefore, the structure will be simple.

BEST MODE FOR CARRYING OUT THE INVENTION

An embodiment of the present invention will now be described below with reference to the diagrams.

Figure 1:
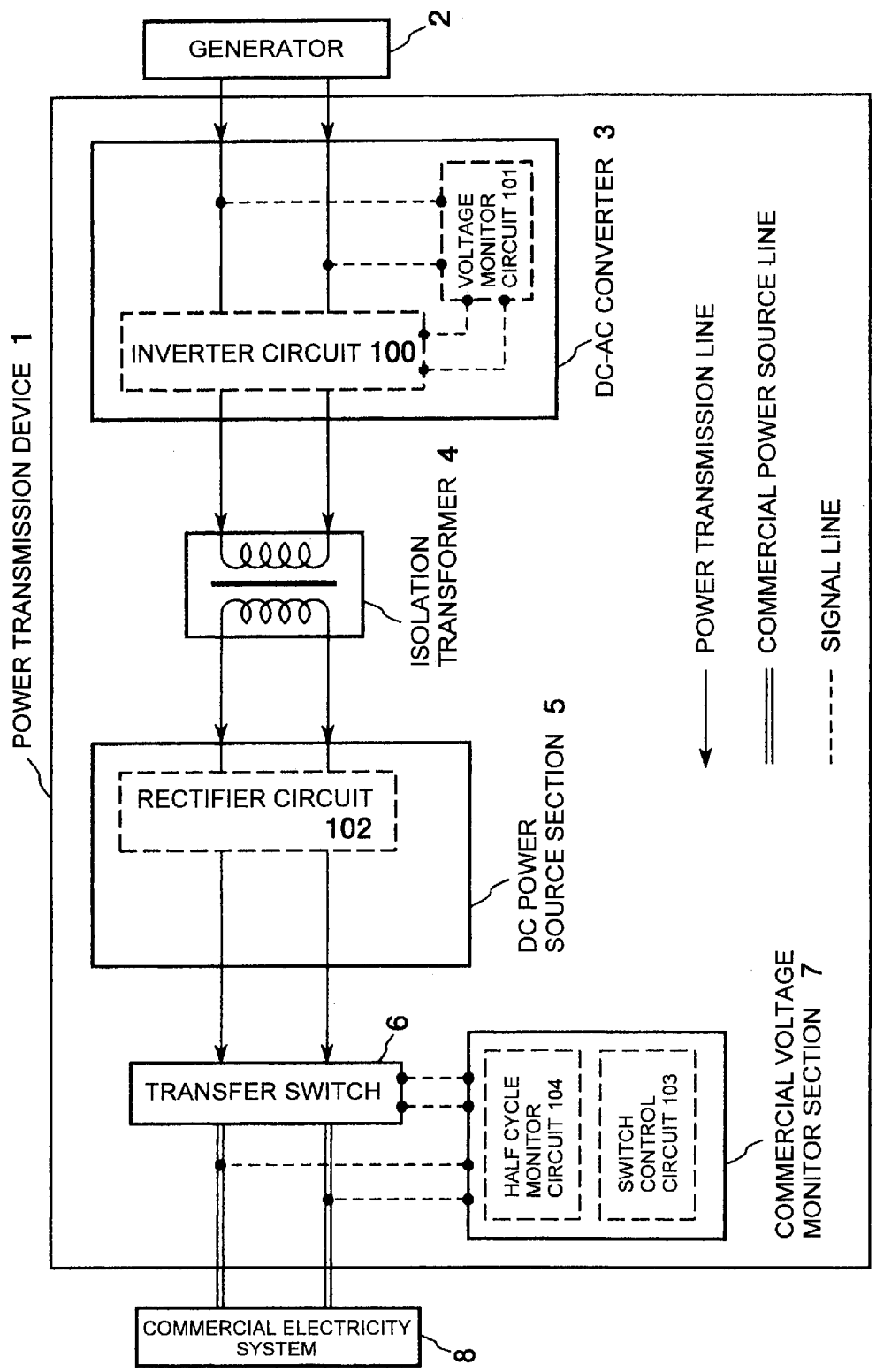
FIG. 1 is an exemplary block diagram of the power transmission device according to an embodiment of the present invention.

FIG. 1 exemplarily shows the structure of the power transmission device according to this embodiment of the present invention.

As shown in FIG. 1, this power transmission device 1 is located between a generator 2 and a commercial electricity system 8. The power transmission device 1 comprises a DC-AC converter 3, an isolation transformer 4, a DC power source section 5, a transfer switch 6, and a commercial voltage monitor section 7.

The generator 2 is a DC power source for generating a DC electric power (DC voltage). The generator 2 is composed of, for example, a solar battery.

The DC-AC converter 3 converts a DC electric power generated by the generator 2 from DC to AC. As shown in FIG. 1, the DC-AC converter 3 is provided with an inverter circuit 100 and a voltage monitor circuit 101.

Figure 2:
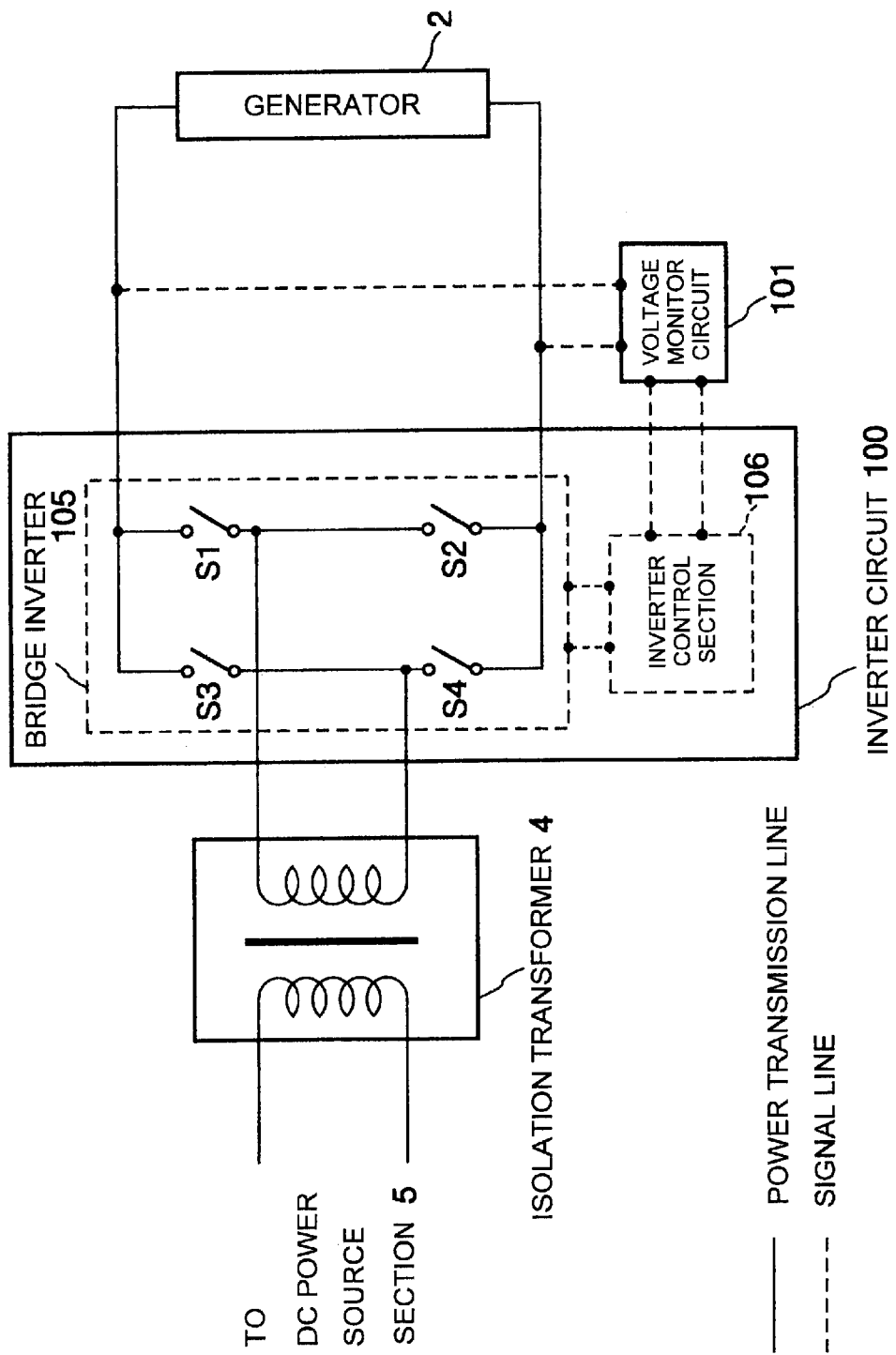
FIG. 2 is an exemplary block diagram showing one example of the DC-AC converter according to an embodiment of the present invention.

As shown in FIG. 2, the inverter circuit 100 comprises a bridge inverter 105 and an inverter control section 106 for controlling this bridge inverter 105. The bridge inverter 105 is composed of switching elements S1 to S4 each of which is provided with an electric current path and an control terminal (not shown). The switching elements SI to S4 are composed of, for example, a field effect transistor.

One end of the electric current path of the switching element S1 and one end of the electric current path of the switching element S3 are connected to one end of the generator 2. One end of the electric current path of the switching element S2 and one end of the electric current path of the switching element S4 are connected to the other end of the generator 2. The other end of the electric current path of the switching element S1 and the other end of the electric current path of the switching element S2 are connected to one end of a primary winding of the isolation transformer 4. The other end of the electric current path of the switching element S3 and the other end of the electric current path of the switching element S4 are connected to the other end of the primary winding of the isolation transformer 4.

The switching elements S1 to S4 will be on or off according to a control signal applied to the control terminal of their own.

The inverter control section 106 is driven by an electric power supplied by the generator 2. The inverter control section 106 controls the switching elements S1 to S4 constituting the bridge inverter 105, to be on or off.

Specifically, the inverter control section 106 controls the switching elements S1 to S4 by supplying each of the control terminals of the switching elements S1 to S4 with a control signal, so that the switching elements S2 and S3 may be off when the switching elements S1 and S4 are on, and the switching elements S1 and S4 may be off when the switching elements S2 and S3 are on.

The switching elements S1 to S4 become on or off according to the aforementioned control conducted by the inverter control section 106. By this working, the bridge inverter 105 inverts a DC electric power supplied from the generator 2 from DC to AC.

The voltage monitor circuit 101 determines whether or not a DC voltage applied by the generator 2 has reached a set level. And when determining that this DC voltage has reached the set level, the voltage monitor circuit 101 supplies the DC electric power output by the generator 2 to a power source of the inverter control section 106. The inverter circuit 100 is driven by the DC electric power supplied by the voltage monitor circuit 101.

The isolation transformer has a primary winding and a secondary winding. The primary winding and the secondary winding are wound to a same iron core. And the primary winding and the secondary winding are isolated from each other.

The primary winding is connected to the DC-AC converter 3. The secondary winding is connected to the DC power source section 5. An AC voltage applied by the DC-AC converter 3 is transformed according to a turn ratio of the primary winding against the secondary winding. This transformed AC voltage is output to the DC power source section 5.

The DC power source section 5 transforms the AC voltage applied by the isolation transformer 4 into a DC voltage. The DC power source section 5 has a rectifier circuit 102.

The rectifier circuit 102 is composed of diodes, a condenser, and the like, and is provided with a positive electrode and a negative electrode. The rectifier circuit 102 rectifies the AC voltage applied by the isolation transformer 4 by the diodes, and smoothes the rectified voltage by the condenser and the like and converts it to a DC voltage. This DC voltage is generated between the positive electrode and the negative electrode of the rectifier circuit 102 (the electric potential of the positive electrode is higher than that of the negative electrode.) The transfer switch 6 is driven by an electric power supplied from the commercial electricity system. The transfer switch 6 supplies or interrupts a supply of the rectified voltage which is to be supplied to the commercial electricity system from the rectifier circuit 102 according to a control signal transmitted form the commercial voltage monitor section 7. The commercial electricity system 8 is provided with a pair of output terminals for generating an AC voltage. When supplying the rectified voltage to the commercial electricity system 8, the transfer switch 6 applies the rectified voltage to between the output terminals of the commercial electricity system 8 in such a way as that the rectified voltage is applied with the same polarity as this AC voltage provided.

And, (A) An output impedance between the positive—negative electrodes of the rectifier circuit 102 is supposed to be higher than that of the output terminals of the commercial electricity system 8.

(B) It is assumed that a load which is to be connected to between the output terminals of the commercial electricity system 8 is connected to between the positive—negative electrodes of the rectifier circuit 102 while the commercial electricity system 8 is cut away from the DC power source section 5. In this case, an electric current flows into the load by application of the rectified voltage, generating a voltage drop in the load. This voltage drop is supposed to be higher than the AC voltage generated by the commercial electricity system 8.

Conditions aforementioned as (A) and (B) being satisfied, the voltage between both ends of the load are maintained approximately equal to the AC voltage generated by the commercial electricity system.

The commercial voltage monitor section 7 comprises a switch control circuit 103 and a half cycle monitor circuit 104. The switch control circuit 103 controls the transfer switch 6 by transmitting a control signal to the transfer switch 6.

The switch control circuit 103 is driven by an electric power supplied from the commercial electricity system 8 (while an electric power is supplied from the DC power source section 5 to the commercial electricity system 8, this electric power also contributes to driving the switch control circuit 103). The switch control circuit 103 detects a voltage Vc of a commercial electricity generated by the commercial electricity system 8, and determines which of the detected voltage Vc and a predetermined voltage threshold levels +Vth and −Vth is higher or lower than the others. And the switch control circuit 103 controls the transfer switch 6 by transmitting a first control signal to the transfer switch 6 according to the determination result. (The level of +Vth is positive, and the level of −Vth is negative.)

Specifically, the switch control circuit 103,
(1) supplies the transfer switch 6 with the first control signal of the high level when determining that the voltage Vc is equal to or higher than the voltage threshold level +Vth of a positive polarity. As a result, the voltage output from the positive electrode of the rectifier circuit 102 in the DC power source section 5 is applied to one of the output terminals of the commercial electricity system 8, and the voltage output from the negative electrode of the rectifier circuit 102 is applied to the other of the output terminals of the commercial electricity system 8.
(2) supplies the transfer switch 6 with the first control signal of the ground level when determining that the voltage Vc is lower than the voltage threshold level +Vth of a positive polarity, and is higher than the voltage threshold level −Vth of a negative polarity. As a result, the commercial electricity system 8 is electrically cut from the DC power source section 5.
(3) supplies the transfer switch 6 with the first control signal of the low level when determining that the voltage Vc of the commercial electricity is equal to or lower than the voltage threshold level −Vth of a negative polarity. As a result, the voltage output from the negative electrode of the rectifier circuit 102 is applied to the one of the output terminals of the commercial electricity system 8, and the voltage output from the positive electrode of the rectifier circuit 102 is applied to the other of the output terminals of the commercial electricity system 8. Namely, the DC voltage supplied from the DC power source section 5 is supplied to the commercial electricity system 8 in a state the polarity is reversed from the state of the above (1).

The half cycle monitor circuit 104 determines whether or not a length of a period of time in which the transfer switch 6 is on (a period of time in which the DC voltage is supplied from the DC power source section 5 to the commercial electricity system 8) is over a half of a length of a cycle of the voltage generated by the commercial electricity system 8. And the half cycle monitor circuit 104 supplies the transfer switch 6 with a second control signal when determining that the length of the period of time is over the half of the length of the cycle. As a result, the transfer switch 6 electrically cuts between the commercial electricity system 8 and the DC power source section 5.

Next, the working of the power transmission device for transmitting power according to this embodiment of the present invention will be described.

A generator 2 composed of a solar battery generates an electric power when the generator 2 is irradiated. The DC-AC converter 3 converts the electric power generated by the generator 2 from DC to AC when the electric power generated by the generator 2 is over a predetermined threshold level. The voltage converted to AC is transformed by the isolation transformer 4 (normally, it is boosted). The transformed AC voltage is converted from AC to DC by the DC power source section 5.

The switch control circuit 103 transmits the first control signal showing which of the voltage Vc of the commercial electricity system 8 and the voltage threshold levels +Vth and −Vth is higher or lower than the others to the transfer switch 6.

The DC voltage output by the DC power source section 5 is supplied or interrupted to be supplied to the commercial electricity system 8 with being provided with a polarity aforementioned as (1) or (3) by the transfer switch being switched. The transfer switch 6 is switched according to the first control signal supplied from the switch control circuit 103.

Figure 3:
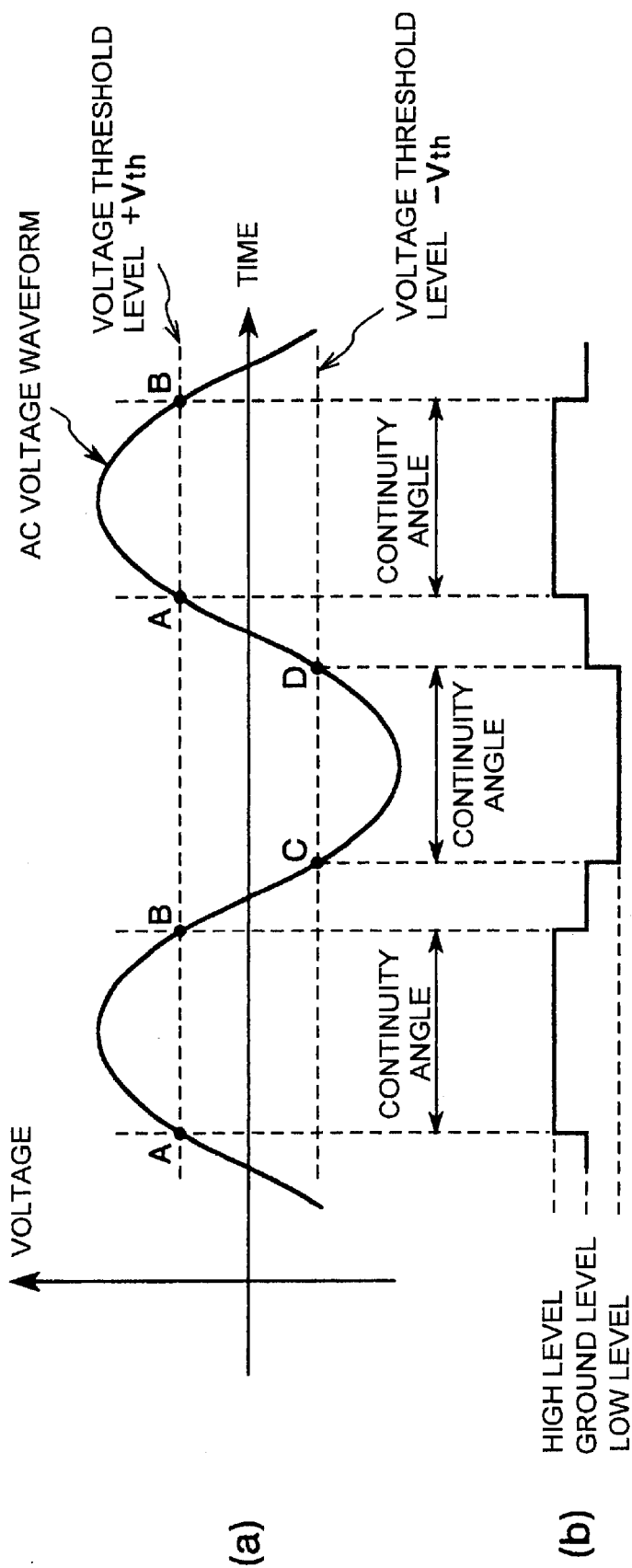
FIG. 3(a) is a graph showing the waveform of the AC voltage generated by a commercial electricity system and the voltage threshold.
FIG. 3(b) is a graph exemplarily showing continuity angles, levels of a first control signal, and relations.

Next, the workings of the switch control circuit 103 and the transfer switch 6 are described with reference to the FIG. 3.

FIG. 3(a) is a graph showing a waveform of the AC voltage generated by the commercial electricity system 8, and the voltage threshold levels +Vth and −Vth. FIG. 3(b) is a graph exemplarily showing continuity angles (periods of time in which the DC power source section 5 is electrically connected to the commercial electricity system 8), levels of the first control signal, and the relations.

The switch control circuit 103 supplies the transfer switch 6 with the first control signal of the high level when determining that the voltage Vc of the commercial electricity system 8 is equal to or higher than the voltage threshold level +Vth of a positive polarity. The transfer switch 6 is switched in response to the first control signal of the high level so that the DC voltage may be supplied from the DC power source section 5 to the commercial electricity system 8 in a state of (1) aforementioned (the polarity of the voltage of the commercial electricity and the polarity of the DC voltage to be supplied will become the same).

The switch control circuit 103 supplies the transfer switch 6 with the first control signal of the ground level when determining that the voltage Vc is lower than the voltage threshold level +Vth of a positive polarity, and higher than the voltage threshold level −Vth of a negative polarity. The period of time in which the transfer switch 6 is supplied with the first control signal of the ground level is the segment B to C and the segment D to A shown in FIG. 3(a).

The transfer switch 6 interrupts the supply of the DC voltage from the DC power source section 5 to the commercial electricity system 8 according to the first control signal of the ground level.

The switch control circuit 103 supplies the transfer switch 6 with the first control signal of the low level when determining that the voltage Vc is equal to or lower than the voltage threshold level −Vth of a negative polarity (i.e., the polarity is negative and the absolute value of the voltage is equal to or higher than Vth).

In response to the first control signal of the low level, the transfer switch 6 supplies the commercial electricity system 8 with the DC voltage generated by the DC power source section 5 in a state of (3) aforementioned (i.e., in a state the polarity is reversed from the state of the above (1)). As a result, the polarity of the voltage of the commercial electricity and the polarity of the DC voltage to be supplied will become the same.

Accordingly, there is no need for pulse-width modulation to keep the phase difference between the continuity angles and the voltage waveform of the commercial electricity system 8 within a predetermined limit. Therefore, a complex control circuit necessary for pulse-width modulation is not required. Because of this, the structure will be simple.

And at the instant when the level of the first control signal moves among the high level, ground level, and low level, there is a possibility of a spike-shaped noise being slightly mixed in the voltage supplied from the DC power source section 5 to the commercial electricity system 8. However, this noise can be removed by using a filter composed of, for example, a coil and a condenser.

And such a situation is assumed to happen as the generator 2 stops, or the DC voltage generated by the generator 2 drops to equal to or lower than the set level. In this case, the voltage monitor circuit 101 interrupts the supply of the electricity output by the generator 2 to the inverter control section 106 to stop the working of the inverter circuit 100. Accordingly, power transmission from the generator 2 to the commercial electricity system 8 stops.

And it is assumed that the commercial electricity system 8 has a short-circuit. In this case, the absolute value of the voltage Vc of the commercial electricity system 8 lowers to be at the level between the voltage threshold levels +Vth and −Vth. Accordingly, the switch control circuit 103 transmits the first control signal of the ground level to the transfer switch 6. The transfer switch 6 cuts between the commercial electricity system 8 and the DC power source section 5.

Because of this, the DC electric power generated by the DC power source section 5 is not supplied to devices connected to the commercial electricity system 8.

It is assumed that the commercial electricity system 8 has a breaking of a wire, or a power failure. In this case, the half cycle monitor circuit 104 detects that the period of time in which the transfer switch 6 is on becomes over the half of the cycle of the AC voltage generated by the commercial electricity system 8. The detection result is transmitted to the transfer switch 6 as the second control signal indicating the low level. The transfer switch 6 cuts between the commercial electricity system 8 and the DC power source section 5.

Accordingly, the DC electric power generated by the DC power source section 5 is not supplied to devices connected to the commercial electricity system 8.

As aforementioned, even if there happens a short-circuit or a breaking of a wire in the generator 2 or in the commercial electricity system 8, the voltage monitor circuit 101 stops the working of the inverter circuit 100, or the commercial voltage monitor section 7 controls the transfer switch 6 to cut between the commercial electricity system 8 and the DC power source section 5. Accordingly, an electricity leakage can be prevented.

As explained above, the generator 2 and the commercial electricity system 8 are isolated by the isolation transformer 4 in regard to the power transmission device according to this embodiment of the present invention. And the DC-AC converter 3 works by an electric power supplied by the generator 2. And the commercial voltage monitor section 7 and the transfer switch 6 work by an electric power supplied by the commercial electricity system 8.

Accordingly, an electricity leakage from the generator 2 to the commercial electricity system 8 can be prevented. Therefore, the devices connected to the commercial electricity system 8 are protected from an electricity leakage.

This invention is not limited to the above embodiment.

Figure 4:
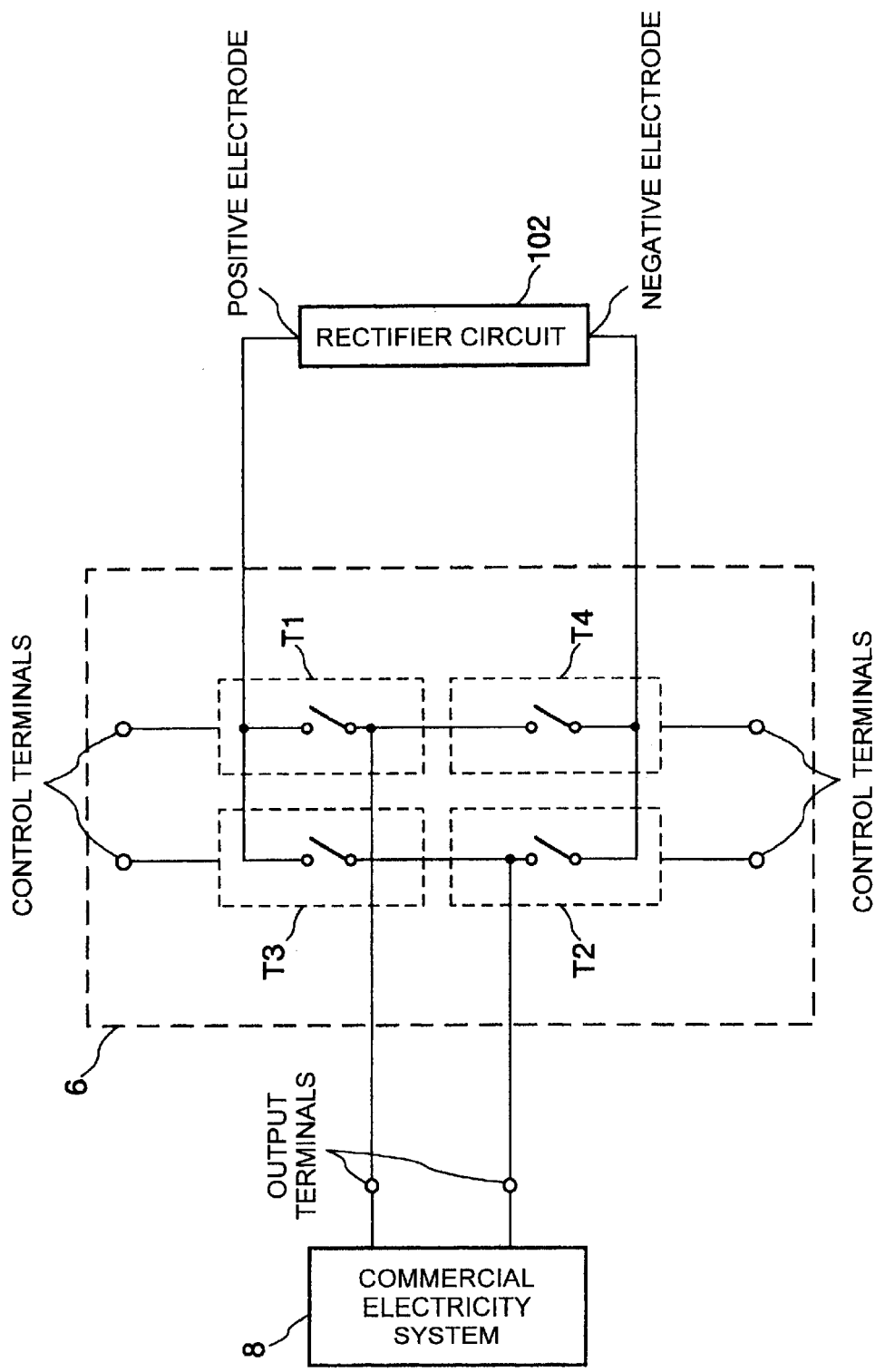
FIG. 4 is an exemplary block diagram showing a variation of the transfer switch.

For example, the transfer switch 6 may be composed of switching elements T1 to T4 each of which is provided with an electric current passage and a control terminal, as shown in FIG. 4. The switching elements T1 to T4 may be composed of, for example, a field effect transistor. In the case where the switching elements T1 to T4 are composed of field effect transistors, the electric current paths of the switching elements T1 to T4 may be composed of an electric current path of the field effect transistor which has the drain and source as both ends, and the control terminals of the switching elements T1 to T4 may be composed of the gates of the field effect transistors.

One end of the electric current path of the switching element T1 and one end of the electric current path of the switching element T3 are connected to the positive electrode of the rectifier circuit 102. One end of the electric current passage of the switching element T2 and one end of the electric current passage of the switching element T4 are connected to the negative electrode of the rectifier circuit 102. The other end of the electric current path of the switching element T1 and the other end of the electric current path of the switching element T4 are connected to one of the output terminals of the commercial electricity system 8. The other end of the electric current path of the switching element T2 and the other end of the electric current path of the switching element T3 are connected to the other of the output terminals of the commercial electricity system 8.

The switching elements T1 to T4 become on or off according to the control signal applied to the control terminal of their own.

In the case where the transfer switch 6 has a structure shown in FIG. 4, by, for example, supplying the first control signal to the control terminal of the switching elements T1 to T4, the switch control circuit 103, (4) controls the switching elements T1 to T4 so that the switching elements T1 and T2 may be on, and the switching elements T3 and T4 may be off when determining that the voltage Vc is equal to or higher than the voltage threshold level +Vth of a positive polarity. As a result, the voltage output from the positive electrode of the rectifier circuit 102 of the DC power source section 5 is applied to the one of the output terminals of the commercial electricity system 8, and the voltage output from the negative electrode of the rectifier circuit 102 is applied to the other of the output terminals of the commercial electricity system 8.

(5) controls the switching elements T1 to T4 so that all of the switching elements T1 to T4 may be off when determining that the voltage Vc is lower than the voltage threshold level +Vth of a positive polarity, and is higher than the threshold level −Vth of a negative polarity. As a result, the commercial electricity system 8 and the DC power source section 5 are electrically cut.

(6) controls the switching elements T1 to T4 so that the switching elements T1 and T2 may be off, and the switching elements T3 and T4 may be on when determining that the voltage Vc of the commercial electricity is equal to or lower than the voltage threshold level −Vth of a negative polarity. As a result, the voltage output from the negative electrode of the rectifier circuit 102 is applied to the one of the output terminals of the commercial electricity system 8, and the voltage output from the positive electrode of the rectifier circuit 102 is applied to the other of the output terminals of the commercial electricity system 8. That is, the DC voltage supplied from the DC power source section 5 is supplied to the commercial electricity system 8 in a state the polarity is reversed from the state of (4) above.

The switching elements T1 to T4 become on or off according to the aforementioned control conducted by the switch control circuit 103.

And if the transfer switch 6 has a structure shown in FIG. 4, the half cycle monitor circuit 104 may determine whether or not the length of the period of time in which one of the switching elements T1 to T4 is on is over the length of the half of the cycle of the voltage generated by the commercial electricity system 8, and controls the transfer switch 6 so that all of the switching elements T1 to T4 may become off when determining that the length of the period of time is over the length of the half of the cycle. As a result, the transfer switch 6 electrically cuts between the commercial electricity system 8 and the DC power source section 5.

And the isolation transformer 4 may be composed of a magnetic leakage transformer having a large leakage reactance. The magnetic leakage transformer is characterized in that the leakage flux is increased to increase the leakage reactance when there is a rise in the amount of an electric current flowing through a winding. Because of this character, an increase in the amount of an electric current flowing through a secondary winding of the isolation transformer 4 is prevented, which prevents an over current in the secondary winding.

Further, the DC power source section 5 may comprise an overvoltage preventing circuit for preventing a rise in a DC voltage output from the rectifier circuit 102 when this DC voltage is excessively rising. The DC voltage output from the DC power source section 5 is prevented from rising excessively by this overvoltage preventing circuit.

The DC power source section 5 may comprise a filter circuit for gentling the response of an electric current supplied from the DC power source section 5 to the commercial electricity system 8 when this electric current rises or falls. This filter circuit prevents a high-frequency noise from mixing into the commercial electricity system 8.

As discussed above, according to this invention, it is possible to provide a power transmission device and a method of transmitting power which are simply composed.

Further, according to this invention, it is possible to provide a power transmission device and a method of transmitting power which are low-cost.

Also, according to this invention, it is possible to provide a power transmission device and a method of transmitting power which are able to prevent an electricity from leaking from the generator to the commercial electricity system, and consequently to prevent an occurrence of a secondary damage.

This invention is not limited to the above embodiments, but is variously changeable or applicative.

This patent application claims the Paris Convention Priority based on Japanese Patent Application No. H11-147374 filed with the Japanese Patent Office on May 27, 1999, the complete disclosure of which is hereby incorporated by reference.

What is claimed is:

1. A power transmitting device which is located between an AC power source (8) for generating an AC voltage and a DC power source (2, 3, 4, and 5) for generating a DC voltage, and comprises:

a transfer switch (6) which is connected to between said DC power source and said AC power source and is for supplying said DC voltage to said AC power source or interrupting a supply of said DC voltage to said AC power source in accordance with a control signal provided thereto; and an AC voltage monitor circuit (7) which is connected to said AC power source and said transfer switch and is for determining whether an absolute value of said AC voltage generated by said AC power source is equal to or higher than a predetermined threshold level or not, supplying said transfer switch with said control signal for controlling said transfer switch to supply said DC voltage to said AC power source in such a way as to provide said DC voltage with the same polarity as said AC voltage when determining that said absolute value is equal to or higher than said threshold level, and supplying said transfer switch with said control signal for controlling said transfer switch to interrupt said supply of said DC voltage to said AC power source when determining that said absolute value is lower than said threshold level.

2. The power transmission device according to claim 1, wherein an output impedance of said DC power source is higher than that of said AC power source, and a voltage drop generated in an outside load which is connected to said AC power source by an electric current supplied from said DC power source is higher than said AC voltage generated by said AC power source.

3. The power transmission device according to claim 1, wherein said AC voltage monitor circuit further comprises a half cycle monitor circuit (104) for determining whether or not a period of time in which said DC power source is supplying said DC voltage to said AC power source is over a half of a cycle of an AC electric power generated by said AC power source, and supplying said transfer switch with said control signal for controlling said transfer switch to interrupt said supply of said DC voltage from said DC power source to said AC power source when determining that said period of time is over said half of said cycle.

4. The power transmission device according to claim 1, wherein:

said transfer switch comprises:

a first switching element (T1) which comprises a first electric current path and a first control terminal;

a second switching element (T2) which comprises a second electric current path and a second control terminal;

third switching element (T3) which comprises a third electric current path and a third control terminal; and a fourth switching element (T4) which comprises a fourth electric current path and a fourth control terminal, one end of said first electric current path and one end of said third electric current path are connected to one of a pair of electrodes which are provided on said DC power source and are for outputting said DC voltage, one end of said second electric current path and one end of said fourth electric current path are connected to the other of said pair of electrodes provided on said DC power source, the other end of said first electric current path and the other end of said fourth electric current path are connected to one of a pair of electrodes which are provided on said AC power source and are for outputting said AC voltage, the other end of said second electric current path and the other end of said third electric current path are connected to the other of said pair of electrodes provided on said AC power source, and said AC voltage monitor circuit:

determines whether a polarity of a voltage output from said one of said pair of electrodes provided on said DC power source is same as or different from that of a voltage output from said one of said pair of electrodes provided on said AC power source;

applies a voltage for controlling said first and second electric current paths to turn on, to said first and second control terminals as said control signal, and applies a voltage for controlling said third and fourth electric current paths to turn off, to said third and fourth control terminals as said control signal when determining that an absolute value of said AC voltage is equal to or higher than said threshold level, and that said polarity of said voltage output from said one of said pair of electrodes provided on said DC power source is same as that of said voltage output from said one of said pair of electrodes provided on said AC power source;

applies a voltage for getting said first and second electric current paths to turn off, to said first and second control terminals as said control signal, and applies a voltage for getting said third and fourth electric current paths to turn on, to said third and fourth control terminals as said control signal when determining that said absolute value of said AC voltage is equal to or higher than said threshold level, and that said polarity of said voltage output from said one of said pair of electrodes provided on said DC power source is different from that of said voltage output from said one of said pair of electrodes provided on said AC power source; and applies a voltage for getting said first to fourth electric current paths to turn off, to said first to fourth control terminasl as said control signal when determining that said absolute value of said AC voltage is lower than said threshold level.

5. The power transmission device according to claim 4, wherein:

said first switching element is composed of a first field effect transistor (T1) whose drain and source serve as both ends of said first electric current path and whose gate serves as said first control terminal;

said second switching element is composed of a second field effect transistor (T2) whose drain and source serve as both ends of said second electric current path and whose gate serves as said second control terminal;

said third switching element is composed of a third field effect transistor (T3) whose drain and source serve as both ends of said third electric current path and whose gate serves as said third control terminal; and said fourth switching element is composed of a fourth field effect transistor (T4) whose drain and source serve as both ends of said fourth electric current path and whose gate serves as said fourth control terminal.

6. The power transmission device according to claim 4, wherein said AC voltage monitor circuit determines whether or not a period of time in which said DC power source is supplying said DC voltage to said AC power source is over a half of a cycle of an AC electric power generated by said AC power source, and applies a voltage for controlling said first to fourth electric current passages to turn off, to said first to fourth control terminals as said control signal when determining that said period of time is over said half of said cycle.

7. A power transmission device which is located between an AC power source (8) for generating an AC voltage and a DC power source (2) for generating a first DC voltage, and comprises:

a DC-AC converter (3) for converting said first DC voltage into an AC voltage and outputting it;

an isolation transformer (4) for transforming said AC voltage output by said DC-AC converter and outputting it;

a rectifier (5) for rectifying said AC voltage output by said isolation transformer to generate a second DC voltage;

a transfer switch (6) which is connected to between said rectifier and said AC power source, and is for supplying said second DC voltage to said AC power source or interrupting a supply of said second DC voltage to said AC power source in accordance with a control signal supplied thereto; and an AC voltage monitor circuit (7) which is connected to said AC power source and said transfer switch and is for determining whether an absolute value of said AC voltage generated by said AC power source is equal to or higher than a predetermined threshold level or not, supplying said transfer switch with said control signal for controlling said transfer switch to supply said second DC voltage to said AC power source in such a way as to provide said second DC voltage with the same polarity as said AC voltage when determining that said absolute value is equal to or higher than said threshold level, and supplying said transfer switch with said control signal for controlling said transfer switch to interrupt said supply of said second DC voltage to said AC power source when determining that said absolute value is lower than said threshold level.

8. The power transmission device according to claim 7, wherein an output impedance of said rectifier is higher than that of said AC power source, and a voltage drop generated in an outside load which is connected to said AC power source by an electric current supplied from said rectifier is higher than said AC voltage generated by said AC power source.

9. The power transmission device according to claim 7, wherein said DC-AC converter comprises:

an inverter (100) for inverting said first DC voltage into an AC voltage when said first DC voltage is applied thereto; and a DC voltage monitor circuit (101) for determining whether a level of said first DC voltage has reached a set level or not, applying said first DC voltage to said inverter when determining that it has reached said set level, and preventing application of said first DC voltage to said inverter when determining that it has not reached said set level.

10. A method of transmitting power for supplying a DC voltage to an AC power source which generates an AC voltage, comprising:

determining whether an absolute value of said AC voltage generated by said AC power source is equal to or higher than a predetermined threshold level or not; supplying said DC voltage to said AC power source in such a way as to provide said DC voltage with the same polarity as said AC voltage when determining that said absolute value is equal to or higher than said threshold level; and interrupting a supply of said DC voltage to said AC power source when determining that said absolute value is lower than said threshold level.

11. The method of transmitting power according to claim 10, wherein an output impedance of a DC power source which generates said DC voltage is higher than that of said AC power source, and a voltage drop generated in an outside load which is connected to said AC power source by an electric current supplied from said DC power source is higher than said AC voltage generated by said AC power source.

12. The method of transmitting power according to claim 10, determining whether or not a period of time in which said DC voltage is supplied to said AC power source is over a half of a cycle of an AC electric power generated by said AC power source, and interrupting said supply of said DC voltage to said AC power source when determining that said period of time is over said half of said cycle.

13. The method of transmitting power according to claim 10, wherein said DC power source which generates said DC voltage comprises a pair of electrodes for outputting said DC voltage and said AC power source comprises a pair of electrodes for outputting said AC voltage, and said method comprising:

determining whether a polarity of a voltage of one of said electrodes provided on said DC power source is same as or different from that of a voltage of one of said electrodes provided on said AC power source;

connecting said one of said electrodes of said DC power source with said one of said electrodes of said AC power source, and connecting the other of said electrodes of said DC power source with the other of said electrodes of said AC power source when determining that said absolute value of said AC voltage is equal to or higher than said threshold level, and that said polarity of said voltage of said one of said electrodes provided on said DC power source is same as that of said voltage of said one of said electrodes provided on said AC power source;

connecting said one of said electrodes of said DC power source with the other of said electrodes of said AC power source, and connecting the other of said electrodes of said DC power source with said one of said electrodes of said AC power source when determining that said absolute value of said AC voltage is equal to or higher than said threshold level, and that said polarity of said voltage of said one of said electrodes provided on said DC power source is different from that of said voltage of said one of said electrodes provided on said AC power source; and cutting between each of said electrodes of said DC power source and each of said electrodes of said AC power source when determining that said absolute value of said AC voltage is lower than said threshold level.

14. The method of transmitting power according to claim 10, wherein said DC voltage is generated by converting a DC voltage for conversion into an AC voltage, transforming said AC voltage acquired from conversion by an isolation transformer, and rectifying said AC voltage acquired from transformation.

15. The method of transmitting power according to claim 14, determining whether a level of said DC voltage for conversion has reached a set level or not, and preventing said conversion of said DC voltage for conversion into an AC voltage when determining that said level of said DC voltage for conversion has reached said set level.

16. A power transmission device which is for supplying a DC voltage generated by DC power sources (2, 3, 4, and 5) to an AC power source (8) for generating an AC voltage, and comprises:

determination means (7) for determining whether an absolute value of said AC voltage generated by said AC power source is equal to or higher than a predetermined threshold level or not;

means (6) for supplying said DC voltage to said AC power source in such a way as to provide said DC voltage with the same polarity as said AC voltage when said determination means determines that said absolute value of said AC voltage is equal to or higher than said threshold level; and means (6) for interrupting a supply of said DC voltage to said AC power source when said determination means determines that said absolute value of said AC voltage is lower than said threshold level.

* * * * *